UNITED STATES PATENT OFFICE.

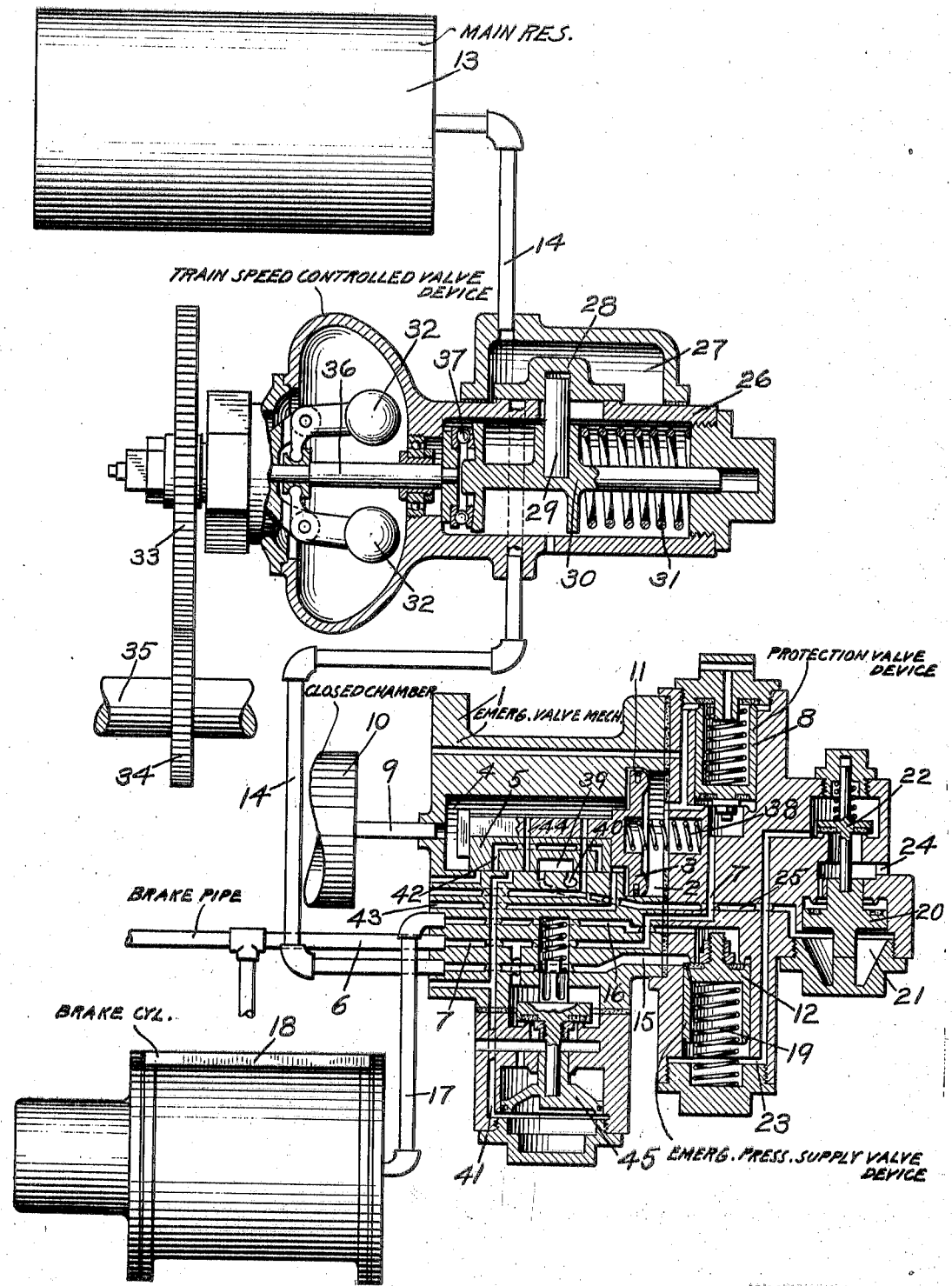

WALTER V. TURNER, OF WILKINSBURG, PENNSYLVANIA, ASSIGNOR TO THE WESTINGHOUSE AIR BRAKE COMPANY, OF WILMERDING, PENNSYLVANIA, A CORPORATION OF PENNSYLVANIA.

SPEED-CONTROLLED BRAKE.

1,283,978.        Specification of Letters Patent.        Patented Nov. 5, 1918.

Application filed July 13, 1916. Serial No. 109,053.

*To all whom it may concern:*

Be it known that I, WALTER V. TURNER, a citizen of the United States, residing at Wilkinsburg, in the county of Allegheny and State of Pennsylvania, have invented new and useful Improvements in Speed-Controlled Brakes, of which the following is a specification.

This invention relates to fluid pressure brakes, and more particularly to a brake apparatus for controlling the brakes according to the speed of the train.

It has heretofore been proposed to provide a brake apparatus adapted to apply the brakes with increased power in an emergency application, for example, by supplying fluid to the brake cylinder at a higher pressure than in a service application of the brakes.

The higher the braking power applied, the greater will be the jolting effect produced by suddenly applying the brakes, and while this effect will not be severe if the train speed is high, at lower speeds, the jolting becomes much more noticeable and is often very disagreeable to passengers.

The principal object of my invention is to provide means controlled by the speed of the train for varying the braking power in an emergency application of the brakes, according to the speed of the train at the time the brake application is made.

In the accompanying drawing, the single figure is a diagrammatic view, mainly in section, of a car brake apparatus embodying my invention.

In order to illustrate one application of my invention, I have shown my invention applied to the emergency portion of a brake equipment such as covered by my prior Patent No. 1,131,971, dated Mar. 16, 1915, in which the emergency portion may comprise a casing 1 having a piston chamber 2 containing an emergency piston 3 and a valve chamber 4 containing an emergency valve 5 adapted to be actuated by said piston.

The piston chamber 2 is normally connected to the brake pipe 6 through a passage 7 controlled by a protection valve device 8, and valve chamber 4, which is connected by pipe 9 to a closed chamber 10, is charged from the brake pipe through a feed groove 11 around piston 3.

According to the patent construction, an emergency fluid pressure supply valve device 12 is provided which controls communication from a source of high pressure supply, such as main reservoir 13, through pipe 14 and passage 15 to passage 16 and pipe 17 leading to brake cylinder 18.

The valve device 12 is normally held closed by a spring 19 and is adapted to be operated by a valve mechanism comprising a piston 20 contained in piston chamber 21 having a passage 25 leading to emergency slide valve 5, and a valve 22 adapted to be operated by piston 20 for venting fluid through a passage 23 from the spring side of the emergency supply valve device 12 to an atmospheric exhaust port 24.

According to a preferred form of my invention, there is interposed in the supply pipe 14 a train speed controlled valve mechanism comprising a casing 26 having a valve chamber 27 connected to the main reservoir side of pipe 14 and containing a slide valve 28 for controlling communication from the valve chamber 27 to the emergency valve side of pipe 14.

The valve 28 is provided with a downwardly extending stem 29 which is carried by an operating member 30 adapted to be shifted in one direction by a spring 31 and in the opposite direction according to the speed of the train.

The speed control mechanism may comprise ordinary speed governor balls 32 adapted to be rotated by a suitable operating connection to a rotating part of the car, such as meshing gears 33 and 34, the gear 34 being secured to the car axle 35.

The centrifugal action of the governor balls 32 effects the longitudinal movement of a stem 36, this movement being preferably transmitted to the member 30 through a ball bearing 37, so that the stem 36 can freely rotate without rotating the member 30.

In operation, the standard brake pipe pressure normally maintains the protection valve 8 in the open position shown in the drawing, so that the piston chamber 2 and valve chamber 4 are normally charged with fluid under pressure and a spring 38 maintains the emergency valve device in release position, in which passage 25 is connected through cavity 39 with exhaust port 40.

The speed mechanism is adjusted to overcome the resistance of spring 31 and open valve 28 to a varying extent according as the speed of the train exceeds a certain minimum rate.

It will thus be seen that if the speed of the train is less than the predetermined minimum rate, the valve 28 will remain in the position shown in the drawing, entirely cutting off communication from the main reservoir 13 to the emergency valve mechanism.

If under the above conditions, the brake pipe pressure is reduced to a predetermined degree at which an emergency application is effected, the protection valve 8 will be shifted to its lower seat, so as to vent fluid from piston chamber 2 and thus effect the movement of the emergency valve device to emergency position.

In this position, the usual quick action valve device 45 is operated by the connection of passage 41 through cavity 42 with a fluid pressure supply passage 43, so that a local reduction in brake pipe pressure is effected.

Passage 25 is also connected to a port 44, so that fluid under pressure is supplied from valve chamber 4 to piston chamber 21. The piston 20 is then operated to open valve 22 and vent fluid through passage 23 from valve device 12, so that said valve device opens communication from passage 15 to brake cylinder passage 16, but since communication is now cut off from the main reservoir 13, the opening of the valve device 12 will have no effect and consequently the brake cylinder pressure will be that due to the usual operation of the service application portion of the brake apparatus, corresponding with the action of an ordinary triple valve device, or as described in my hereinbefore mentioned patent, but which it is not considered necessary to illustrate in the present case.

If, however, the train speed exceeds the minimum rate, the centrifugal action of the governor balls 32 will cause the movement of stem 36, so that member 30 is actuated to open the valve 28, and this opening will be increased in proportion to the increase in speed of the train, so that the emergency braking power will bear a relation to the speed of the train and thus provide for so regulating the braking pressure that severe jolting effects will be avoided in stopping the train.

Having now described my invention, what I claim as new and desire to secure by Letters Patent, is:

1. In a fluid pressure brake, the combination with a brake pipe and means operated upon a sudden reduction in brake pipe pressure for effecting an emergency application of the brakes with increased power, of a train speed controlled device for varying the braking power in an emergency application to correspond with the speed of the train.

2. In a fluid pressure brake, the combination with a brake pipe and means operated upon a sudden reduction in brake pipe pressure for effecting an emergency application of the brakes with increased power, of a train speed controlled device for limiting the emergency braking power to correspond with speeds less than a predetermined maximum.

3. In a fluid pressure brake, the combination with means adapted to effect an emergency application of the brakes at a higher brake cylinder pressure than in a service application, of a train speed controlled device for varying the opening through which fluid is supplied to the brake cylinder in an emergency application according to the speed of the train.

4. In a fluid pressure brake, the combination with means adapted to effect an emergency application of the brakes at a higher brake cylinder pressure than in a service application, of a train speed controlled device adapted at a predetermined maximum speed to permit full flow of fluid to the brake cylinder in an emergency application and to reduce said flow as the train speed is reduced.

5. In a fluid pressure brake, the combination with means adapted to effect an emergency application of the brakes at a higher brake cylinder pressure than in a service application, of a train speed controlled device adapted at a predetermined maximum speed to permit full flow of fluid to the brake cylinder in an emergency application, to reduce the flow as the train speed is reduced and finally at a predetermined minimum speed to entirely cut off said flow.

6. In a fluid pressure brake, the combination with a source of fluid pressure, a brake cylinder, and an emergency valve mechanism operating to supply fluid from said source to the brake cylinder in an emergency application of the brakes, of a train speed controlled device for controlling communication from said source through the emergency valve mechanism to the brake cylinder and adapted to reduce the flow of fluid as the train speed is reduced.

7. In a fluid pressure brake, the combination with a main reservoir, a brake cylinder, and an emergency valve device for supplying fluid from the main reservoir to the brake cylinder in an emergency application of the brakes, of a valve for controlling the rate of flow from the main reservoir through said emergency valve device to the brake cylinder and a train speed controlled mechanism for operating said valve.

In testimony whereof I have hereunto set my hand.

WALTER V. TURNER.